(12) United States Patent
Bui et al.

(10) Patent No.: US 12,460,444 B2
(45) Date of Patent: Nov. 4, 2025

(54) ALIGNMENT GUIDE FOR A DOOR HANDLE ASSEMBLY

(71) Applicant: ASSA ABLOY Americas Residential Inc., New Haven, CT (US)

(72) Inventors: Jeanette Vy Bui, Lake Forest, CA (US); Michael Winardi, Chino Hills, CA (US); Lynthia Li, Middleton, WI (US); Gerald Chong, Middleton, WI (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 630 days.

(21) Appl. No.: 17/998,343

(22) PCT Filed: Dec. 10, 2020

(86) PCT No.: PCT/US2020/064193
§ 371 (c)(1),
(2) Date: Nov. 9, 2022

(87) PCT Pub. No.: WO2021/119243
PCT Pub. Date: Jun. 17, 2021

(65) Prior Publication Data
US 2023/0228118 A1    Jul. 20, 2023

Related U.S. Application Data (60) Provisional application No. 62/948,090, filed on Dec. 13, 2019.

(51) Int. Cl.
*E05B 3/06* (2006.01)
*E05B 3/04* (2006.01)
(Continued)

(52) U.S. Cl.
CPC ............... *E05B 3/06* (2013.01); *E05B 3/04* (2013.01); *E05B 13/10* (2013.01); *E05B 63/006* (2013.01)

(58) Field of Classification Search
CPC ... E05B 3/06; E05B 3/04; E05B 13/10; E05B 63/006; E05B 63/0056; Y10T 292/06;
(Continued)

(56) References Cited

U.S. PATENT DOCUMENTS

| 5,683,127 A | 11/1997 | Chamberlain |
| 7,066,507 B2 * | 6/2006 | Don .......................... E05B 9/08 292/357 |

(Continued)

FOREIGN PATENT DOCUMENTS

| CN | 103608535 A | 2/2014 |
| CN | 111219105 A | 6/2020 |

(Continued)

OTHER PUBLICATIONS

International Search Report and Written Opinion for PCT/US2020/064193 (Apr. 2, 2021).
(Continued)

*Primary Examiner* — Christine M Mills
*Assistant Examiner* — Yahya Sidky
(74) *Attorney, Agent, or Firm* — Merchant & Gould P.C.

(57) ABSTRACT

A door handle assembly includes an interior chassis, an exterior chassis, and an alignment guide. The interior chassis includes an interior trim portion, an interior handle mount rotatably attached to the interior trim portion, and an interior spindle portion rotatable with the interior handle mount. The exterior chassis includes an exterior trim portion, an exterior handle mount rotatably attached to the exterior trim portion, an exterior spindle portion rotatable with the exterior handle mount and axially aligned with the interior handle mount,
(Continued)

and a mounting post extending toward the interior chassis from the exterior trim portion offset from the exterior spindle portion. The alignment guide is removably attached to the interior trim portion and is formed of a resilient material. The alignment guide extends toward the exterior chassis from the interior chassis and includes an aperture aligned to receive the mounting post.

23 Claims, 11 Drawing Sheets

(51) Int. Cl.
*E05B 13/10* (2006.01)
*E05B 63/00* (2006.01)

(58) Field of Classification Search
CPC . Y10T 292/858; Y10T 292/88; Y10T 292/91; Y10S 292/51; Y10S 292/53; Y10S 292/54; Y10S 292/60
See application file for complete search history.

(56) References Cited

U.S. PATENT DOCUMENTS

| | | | |
|---|---|---|---|
| 2002/0117867 A1* | 8/2002 | Bates | E05C 1/163 292/348 |
| 2003/0052492 A1* | 3/2003 | Massey | E05C 1/04 292/341.15 |
| 2009/0211318 A1* | 8/2009 | Pilotelli | E05B 63/006 70/91 |
| 2017/0275915 A1* | 9/2017 | Murphy | E05B 55/005 |

FOREIGN PATENT DOCUMENTS

| | | |
|---|---|---|
| EP | 1882798 B1 | 2/2010 |
| JP | H07293052 A | 11/1995 |
| KR | 10-0773020 B1 | 11/2007 |
| TW | 201337081 | 9/2013 |

OTHER PUBLICATIONS

PCT International Preliminary Report on Patentability in Application PCT/US2020/064193, mailed Jun. 23, 2022, 9 pages.

* cited by examiner

ALIGNMENT GUIDE FOR A DOOR HANDLE ASSEMBLY

CROSS-REFERENCE TO RELATED APPLICATION

This application is a U.S. National Stage Application of PCT International Patent Application No. PCT/US2020/064193, filed Dec. 10, 2020 which claims the benefit of priority to U.S. Provisional Patent Application No. 62/948,090, filed Dec. 13, 2019, which applications are incorporated herein by reference. To the extent appropriate, a claim of priority is made to each of the above-disclosed applications.

TECHNICAL FIELD

This invention relates to the field of door handle assemblies. In particular, this invention relates to a device and method for alignment of door handle assemblies and trim pieces.

BACKGROUND

Contemporary style locks and door handle assemblies are becoming increasingly popular. These contemporary style locks generally have square or rectangular shaped trims to complement levers with straight edges. Trim pieces with straight lines are often harder to install while ensuring that the lines are plumb. An installer can only see one side of the trim when installing the door handle assembly, and when tightening the mounting screws, the opposing side of the trim can become crooked or tilted.

Another problem that arises is that door handle assemblies have a tendency to drop and tilt within the borehole of the door, which exaggerates the problem of trying to keep the trim pieces straight and plumb. Current locks have features to help align the trim pieces; however, they are rigidly attached to the handle assembly and can cause problems due to poor (misaligned) door preparations. Further, the currently available features to align trim pieces are not detachable from the lock assembly, and cannot accommodate imperfect boreholes in doors.

SUMMARY

In general terms, this disclosure is directed towards a device and method for installing and aligning a door handle assembly in a door.

In a first aspect, a door handle assembly is described. The door handle assembly includes an interior chassis, an exterior chassis, and an alignment guide. The interior chassis includes an interior trim portion, an interior handle mount rotatably attached to the interior trim portion, and an interior spindle portion rotatable with the interior handle mount. The exterior chassis includes an exterior trim portion, an exterior handle mount rotatably attached to the exterior trim portion, an exterior spindle portion rotatable with the exterior handle mount and axially aligned with the interior handle mount, and a mounting post extending toward the interior chassis from the exterior trim portion offset from the exterior spindle portion. The alignment guide is removably attached to the interior trim portion and is formed of a resilient material. The alignment guide extends toward the exterior chassis from the interior chassis and includes an aperture aligned to receive the mounting post.

In another aspect, a door handle assembly is described. The door handle assembly includes an interior chassis, an exterior chassis, and an alignment guide. The interior chassis is mounted on an interior side of the door and includes an interior trim portion, an interior handle mount rotatably attached to the interior trim portion, and an interior spindle portion rotatable with the interior handle mount. The exterior chassis is mounted on an exterior side of the door and includes an exterior trim portion, an exterior handle mount rotatably attached to the exterior trim portion, an exterior spindle portion rotatable with the exterior handle mount and axially aligned with the interior handle mount, and a mounting post extending toward the interior chassis from the exterior trim portion offset from the exterior spindle portion. The alignment guide is removably attached to the interior trim portion and is formed of a resilient material. The alignment guide extends toward the exterior chassis from the interior chassis and includes an aperture aligned to receive the mounting post.

In yet another aspect, a method of installing a door handle assembly is described. The method includes positioning a latch assembly at least partially within a crossbore of a door. An interior chassis is positioned at a borehole on an interior side of the door. The interior chassis comprises an interior trim portion, an interior handle mount rotatably attached to the interior trim portion, an interior spindle portion rotatable with the interior handle mount, and at least one alignment guide comprising an aperture aligned to receive a mounting post and removably attached to the interior trim portion and formed of a resilient material. An exterior chassis is positioned at the borehole on an exterior side of the door. The exterior chassis comprises an exterior trim portion, an exterior handle mount rotatably attached to the exterior trim portion, an exterior spindle portion rotatable with the exterior handle mount and axially aligned with the interior handle mount, and at least one mounting post extending toward the interior chassis from the exterior trim portion offset from the exterior spindle portion. The at least one mounting post is aligned within the aperture of the at least one alignment guide. Then, at least one mounting screw is inserted and tightened into a corresponding mounting post that extends from the interior trim portion through the at least one alignment guide and the at least one mounting post to the exterior trim portion.

Corresponding reference characters indicate corresponding parts throughout the several views. The exemplifications set out herein illustrate an embodiment of the invention, and such exemplifications are not to be construed as limiting the scope of the invention in any manner.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In general, and according to the present disclosure, door handle assemblies often require careful installation to ensure that the interior trim portion and the exterior trim portion align correctly, especially when the trim portions are square. Additionally, imperfect boreholes in doors can create problems when installing door handle assemblies if there is no way to compensate for the door misalignment with the door handle assembly.

The door handle assembly described herein includes an alignment feature that allows a user to install the door handle assembly using one hand to square one of the trim portions and the other hand to attach a mounting screw. The alignment feature engages a mounting post that allows a mounting screw to be self-aligned or self-guided, which automatically aligns the interior and exterior trim portions of the door handle assembly.

The alignment feature is made from a semi-flexible material and is configured to be removably attached to a chassis portion of a door handle assembly. The alignment guide material accommodates door preparation misalignment because it is semi-rigid. The alignment guide makes installing a door handle assembly easier by automatically aligning the exterior trim assembly with the interior trim assembly, and ensuring a straight trim installation. The alignment guide allows an installer to use one hand to hold the trim assemblies while tightening the mounting screw(s) using the other hand. The alignment guide also prevents the door handle assembly from dropping and tilting during installation and everyday use.

Figure 1:
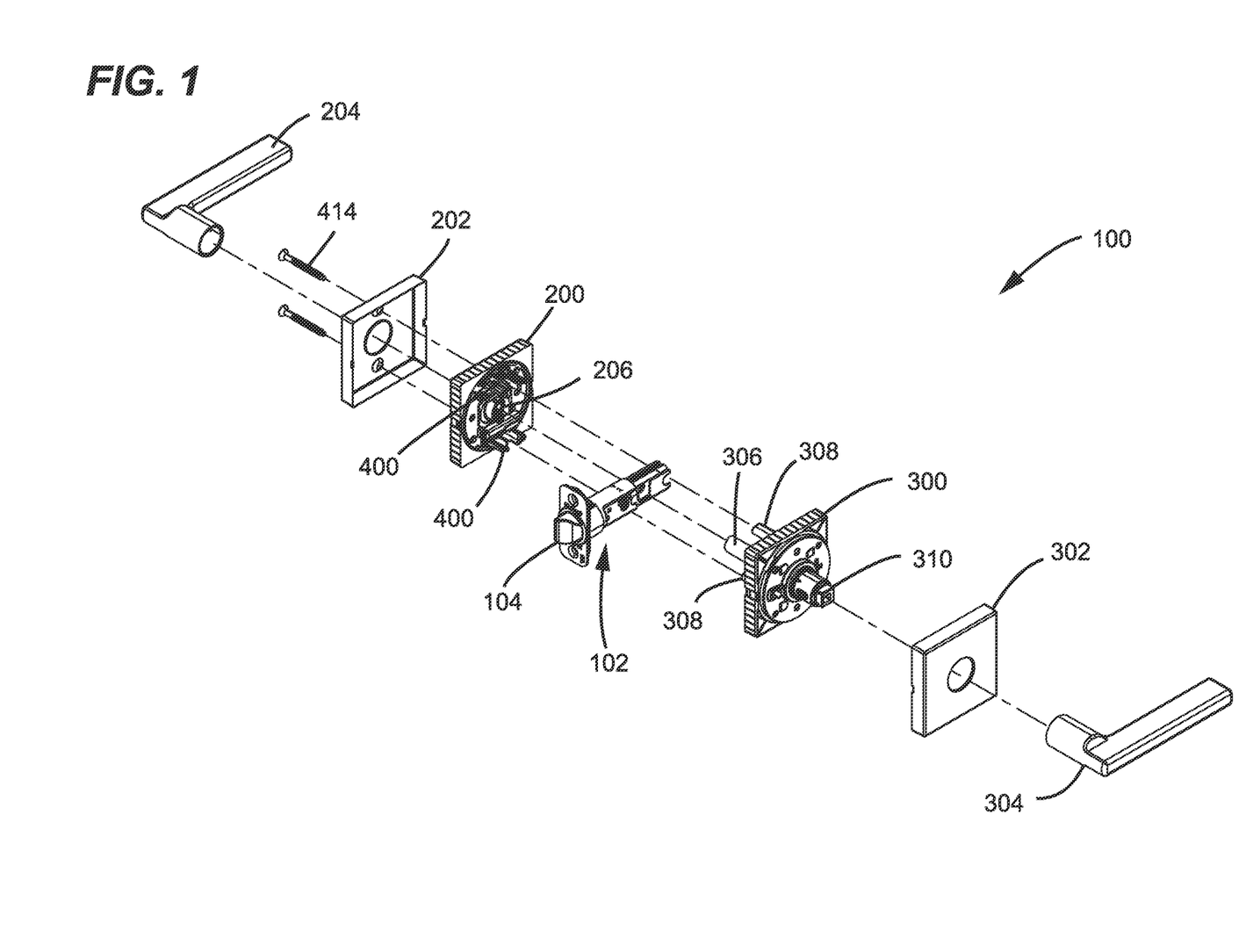
FIG. 1 illustrates an example exploded view of a door handle assembly.

FIG. 1 illustrates an example exploded view of a door handle assembly 100 according to example embodiments herein. The door handle assembly 100 includes a latch assembly 102, an interior chassis 200, and an exterior chassis 300. The latch assembly 102 includes at least a latch bolt 104 and is capable of accepting an exterior spindle portion 306 of the exterior chassis 300 for actuation of the latch bolt 104. Although not shown, the door handle assembly 100 may also include a locking feature.

The interior chassis 200 includes at least a removable interior trim portion 202, an interior handle mount (not shown), and an interior spindle portion 206. The interior handle mount (not shown) is rotatably attached to the interior trim portion 202 and attached to an interior handle 204. An alignment guide 400 is removably attachable to the interior chassis 200, and is described in more detail below.

The exterior chassis 300 includes at least a removable exterior trim portion 302, an exterior handle mount 310, and an exterior spindle portion 306. The exterior handle mount 310 is rotatably attached to the exterior trim portion 302 and attached to an exterior handle 304. The exterior spindle portion 306 is rotatable with the exterior handle mount 310 and axially aligned with the interior handle mount (not shown). The exterior chassis 300 also includes a mounting post 308. The mounting post 308 extends toward the interior chassis 200 from the exterior trim portion 302 and is offset from the exterior spindle portion 306.

As shown, each of the interior chassis 200 and the exterior chassis 300 are square in shape; however, the trim portions 202, 302 may be any other shape.

While not required, FIG. 1 shows an interior chassis 200 comprising two alignment guides 400. A first alignment guide 400 is located at a top portion of the interior chassis 200 when installed in a door, and a second alignment guide 400 is located at a bottom portion of the interior chassis 200, offset 180° from each other. The exterior chassis 300 is shown with two mounting posts 308, wherein the two mounting posts 308 are also offset 180° from each other. In alternative embodiments, only one alignment guide 400 and one mounting post 308 may be present. In yet another embodiment, at least one or both of the alignment guide(s)

400 may be removed from the interior chassis 200, since the one or more alignment guides 400 are detachable from the interior chassis.

Figure 2:
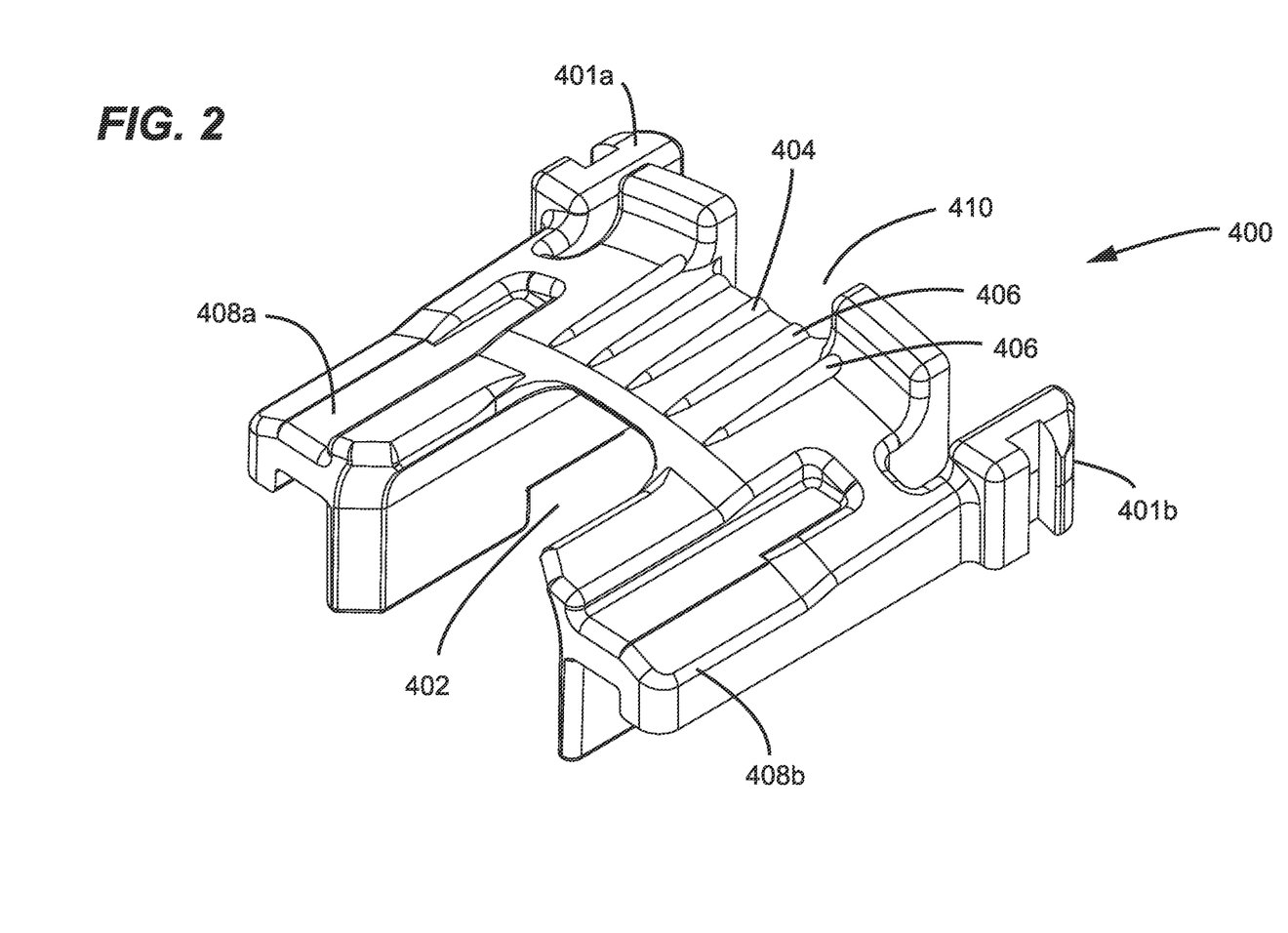
FIG. 2 illustrates an alignment guide according to an example embodiment.

FIG. 2 illustrates an example embodiment of an isolated alignment guide 400. As previously mentioned, at least one alignment guide 400 is removably attached to the interior chassis 200. In an embodiment, two alignment guides 400 are removably attached to the interior chassis 200. The alignment guide(s) 400 are attached to the interior chassis 200 via a snap fit mechanism, seen as snap fit tabs 401a-b. However, in alternative embodiments, other attachment types may be used, such as a friction fit mechanism, or via screws affixing the alignment guide(s) 400 to the interior chassis 200.

Each alignment guide 400 includes a bore engagement surface 404 comprising a plurality of ridges 406. The bore engagement surface 404 (referred to as bore engagement surfaces 404a, 404b when two alignment guides are present) is configured to engage with the borehole located within a door. The bore engagement surface 404 has a curved surface, the curved surface having a radius of curvature that matches a radius of curvature of the borehole within the door. The plurality of ridges 406 form a frictional engagement with the borehole of the door. The plurality of ridges 406 extend upright from the bore engagement surface 404 and help create a frictional fit within the borehole of the door. The frictional fit helps to maintain the interior chassis 200 in a correct orientation, and prevents the interior trim portion 202 from dropping or tilting over time.

The alignment guide 400 also includes a first extension portion 408a and a second extension portion 408b that extend from the bore engagement surface 404. For example, when installed in a door, the first and second extension portions 408a, 408b extend into the borehole in a longitudinal direction. A channel 402 is formed between the first extension portion 408a and the second extension portion 408b. The channel 402 is configured to accept the mounting post 308 of the exterior chassis 300. The width of the channel 402 is sized to snugly accept the mounting post 308, and large enough to accommodate a mounting screw.

In example embodiments, the length of the first and second extension portions 408a, 408b is less than the width of the borehole of the door, for example, the first and second extension portions 408a, 408b may have a length of less than 1⅜ inches and preferably less than one inch but greater than ½ inch. Generally, the relative lengths of the extension portions 408a, 408b and the mounting post 308 are such that the mounting post 308 is engaged within the channel 402 prior to the interior chassis 200 and exterior chassis 300 being positioned flush with the door as the alignment guide 400 and mounting post 308 are inserted within the borehole. This is the case despite accommodating varying width doors (typically 1⅜ inches to 1⅞ inches). For example, in some circumstances, the mounting post 308 can extend 1 inch to 1¼ inches, and the extension portions 408a, 408b extend ¾ to 1¼ inches, such that the mounting post 308 is inserted within the channel 402 as interior chassis 200 and exterior chassis 300 are brought together from a distance of greater than 1⅞ inches (e.g., at a distance of 2 inches or more). However, the channel 402 is of adequate depth to allow the interior chassis 200 and exterior chassis 300 to converge to a distance of as little as 1¼ to 1⅜ inches to accommodate varying door thicknesses, typically in the range of 1⅜ inches to 1⅞ inches.

The alignment guide 400 also includes a removal feature 410 that allows a user to remove the alignment guide 400 from the interior chassis 200, if needed. The removal feature 410 may be located adjacent the bore engagement surface 404, on an opposing side of the bore engagement surface 404 from the first and second extension portions 408a, 408b. In an installed configuration, the removal feature 410 is located nearer the interior trim portion 202 than the extension portions 408a, 408b. The removal feature 410 can be, in the embodiment shown, a pry gap that is sized to receive a flat-head screwdriver or other planar tool usable to urge the alignment guide 400 away from the interior chassis 200.

The alignment guide 400 is made from a resilient material, such as a semi-rigid material. The material allows for some flexibility for the alignment guide 400 to accommodate poor door preparation, or door misalignment issues. Example resilient materials include ABS, EPDM rubber, or other resins or elastomers with similar material properties.

Figure 3:
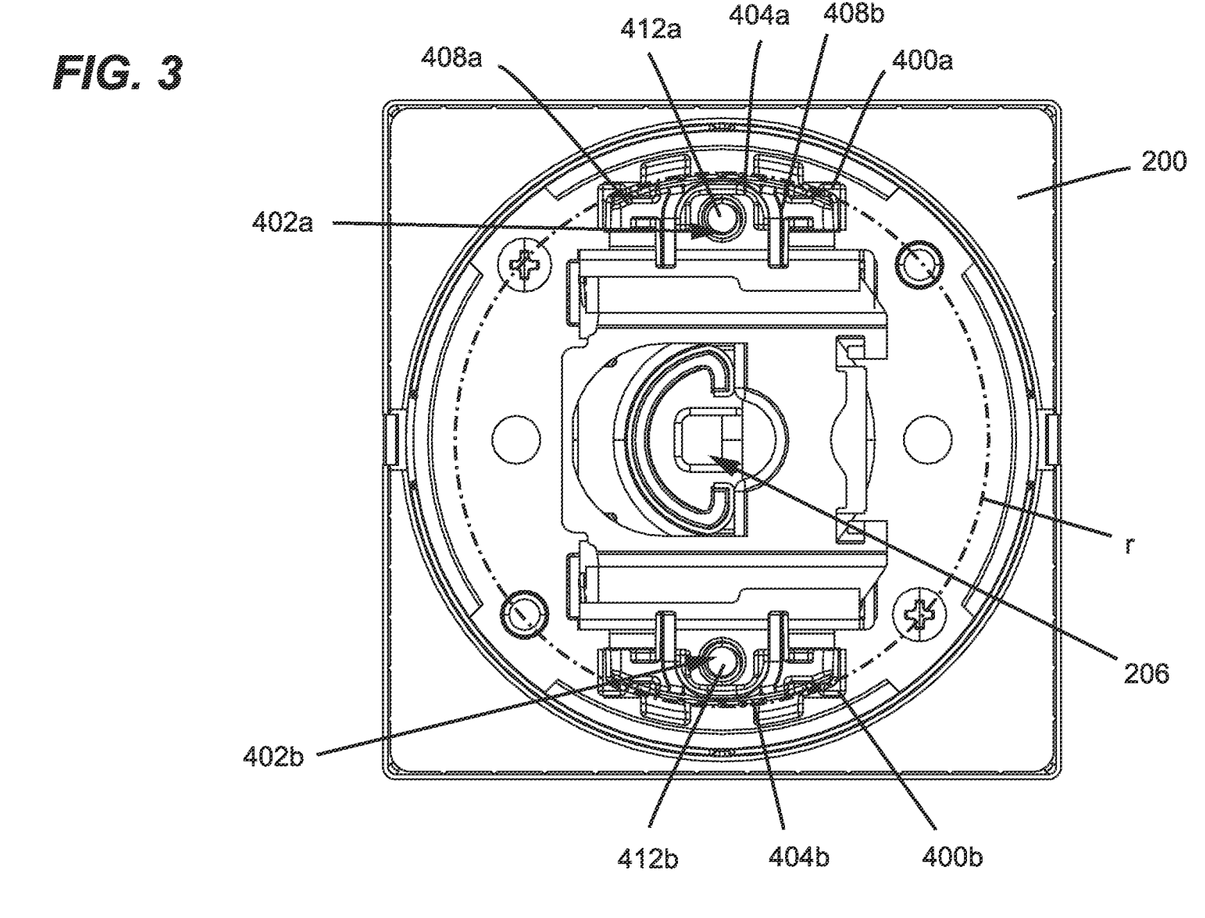
FIG. 3 illustrates an example embodiment of an interior chassis having a first and second alignment guide.

FIG. 3 illustrates an example embodiment of an interior chassis 200 having a first alignment guide 400a and a second alignment guide 400b offset 180° from each other. The interior chassis 200 has an interior spindle portion 206 located at a center, and configured to engage the latch assembly (not shown).

In an installed configuration, the first alignment guide 400a is located on a top portion of the interior chassis 200 and the second alignment guide 400b is located at a bottom portion of the interior chassis 200. In an embodiment with two alignment guides 400a, 400b, a first alignment guide 400a is installed with the bore engagement surface 404a facing upwards, and the second alignment guide 400b is installed with the bore engagement surface 404b facing downwards, or in an opposing direction.

Each of the alignment guides 400a, 400b include the bore engagement surface 404a, 404b that are curved to form an overall "virtual" diameter matching the borehole. In other words, a radius of curvature r of the bore engagement surface 404 is the same as the radius of curvature r of the borehole in the door, and the bore engagement surfaces 404a, 404b are spaced from each other at a standard borehole diameter. For example, a standard borehole is 2⅛ inches in diameter, and the bore engagement surfaces 404a, 404b are configured to have the same radius of curvature and spacing. While the bore engagement surfaces 404a, 404b are configured to have a radius of curvature r to match the borehole of the door, the bore engagement surfaces 404a, 404b are semi-rigid and can accommodate an imperfect borehole.

The alignment guide 400 also includes the channel 402 formed between the first and second extension portions 408a, 408b. The channel 402 also includes a mounting screw borehole 412 configured to accept a mounting screw (not shown). The mounting screw is inserted through the borehole 412 to engage a threaded interior surface of the mounting post 308 to securely connect the interior chassis 200 to the exterior chassis 300.

Figure 4:
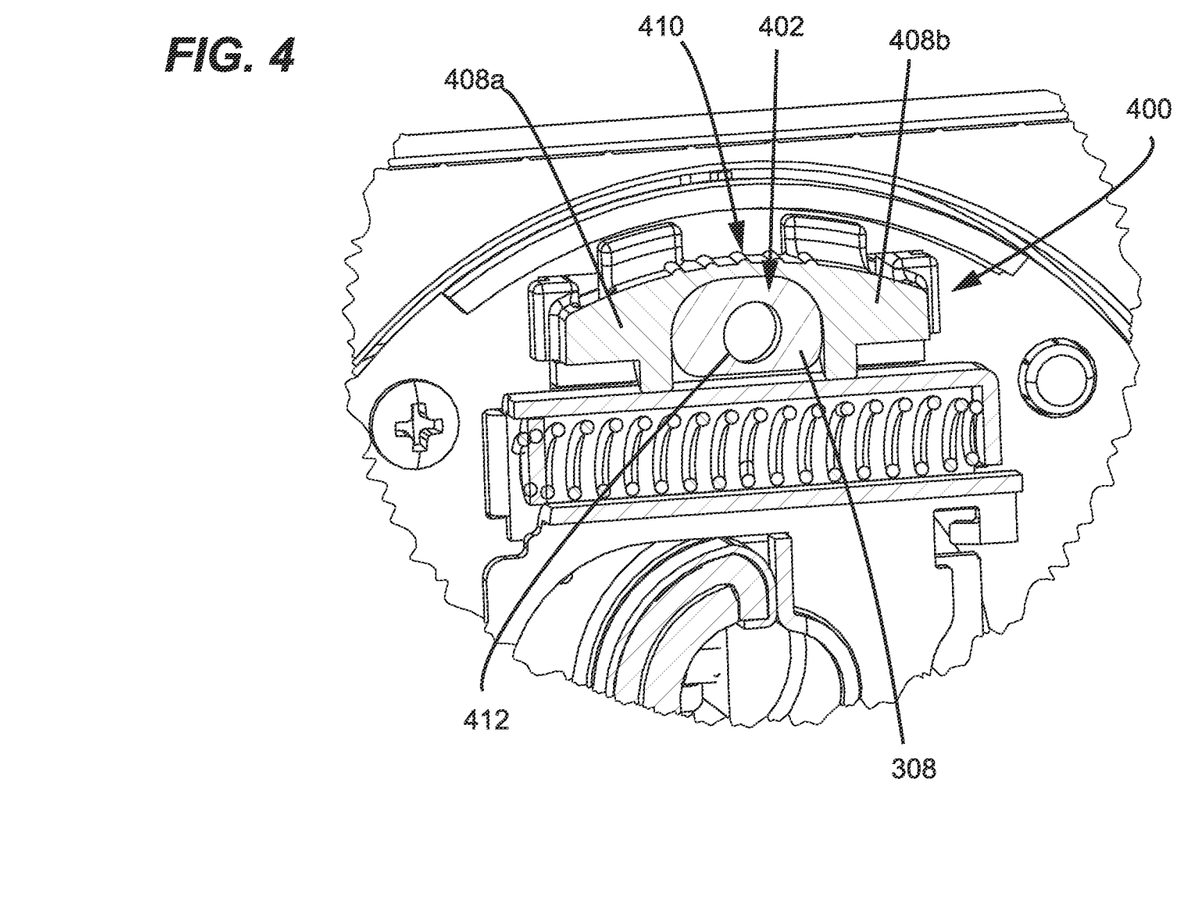
FIG. 4 illustrates a vertical cross-sectional view of the alignment guide of FIG. 2.

FIG. 4 illustrates a vertical cross-sectional view of an alignment guide 400 connected to the mounting post 308. The mounting post 308 fits snugly inside the channel 402 of the alignment guide 400. As shown, the mounting post 308 has an oval shape; however, other shapes are possible. The mounting post 308 also includes the mounting screw borehole 412. The sliding, telescoping engagement between the channel 402 and the mounting post 308 aligns the mounting screw borehole 412 for automatic alignment of a mounting screw 414, and therefore aligns the exterior trim portion and the interior trim portion.

The alignment guide 400 also includes the removal feature 410 that allows a user to remove the alignment guide 400 from the interior chassis 200 if needed. The removal feature 410 is a recess located adjacent the channel 402. In an installed configuration, the removal feature 410 is located on the outside of the bore engagement surface 404. In use, a user can use a tool, such as a flat head screwdriver, to remove the alignment guide 400 from the interior chassis 200 by placing the flat head screwdriver in the removal feature 410 and pushing the alignment guide 400 away from the interior chassis 200. In an embodiment where the alignment guide 400 is attached to the interior chassis 200 with a screw, the screw must be removed first before the alignment guide 400 can be removed.

Figure 5:
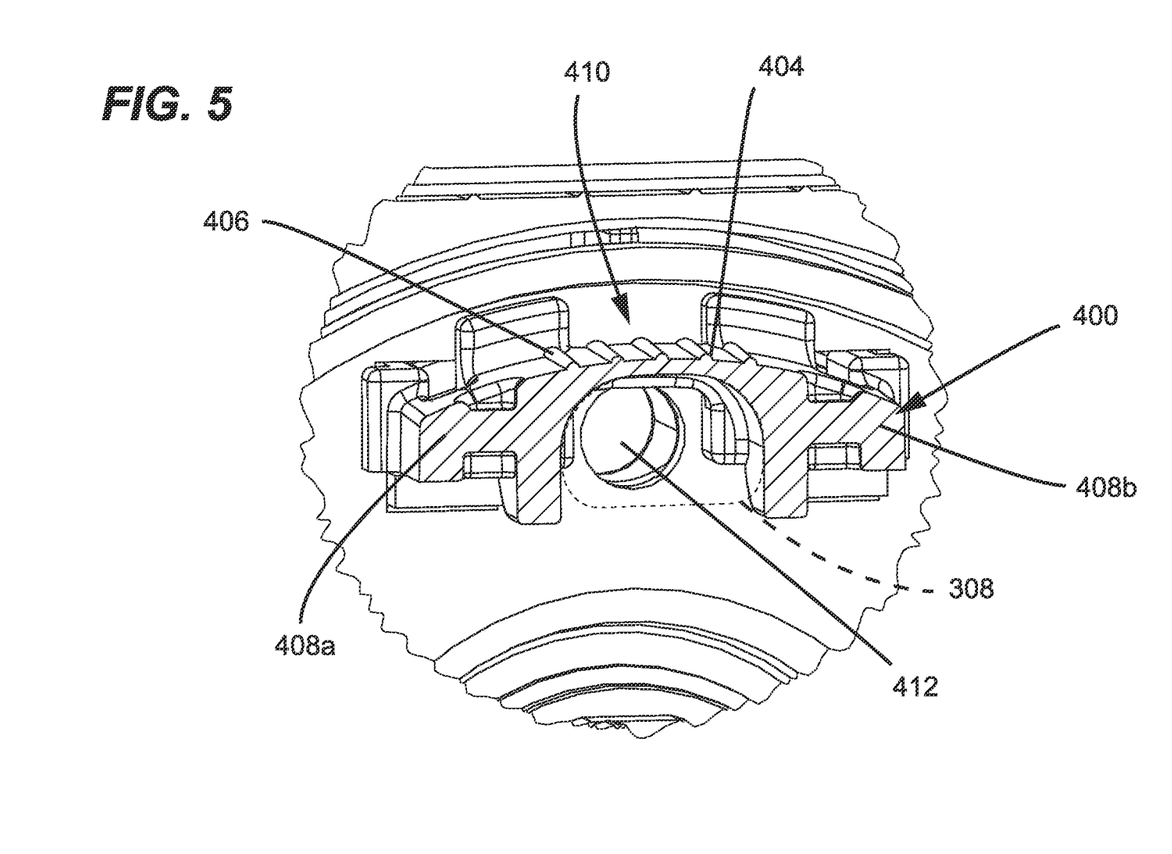
FIG. 5 illustrates another vertical cross-sectional view of the alignment guide of FIG. 2.

FIG. 5 illustrates another vertical cross-sectional view of the alignment guide 400. The mounting post 308 is located within the channel 402 of the alignment guide 400.

The plurality of ridges 406 extend in a longitudinal direction along the bore engagement surface 404. In an embodiment, the plurality of ridges 406 are crushed rib-shaped and sized to fit snugly within the door borehole. In alternative examples, the ridges 406 can extend in any direction non-parallel with the circumferential direction of the borehole, so as to maintain a rotational position of the interior chassis within the borehole when inserted therein.

Figure 6:
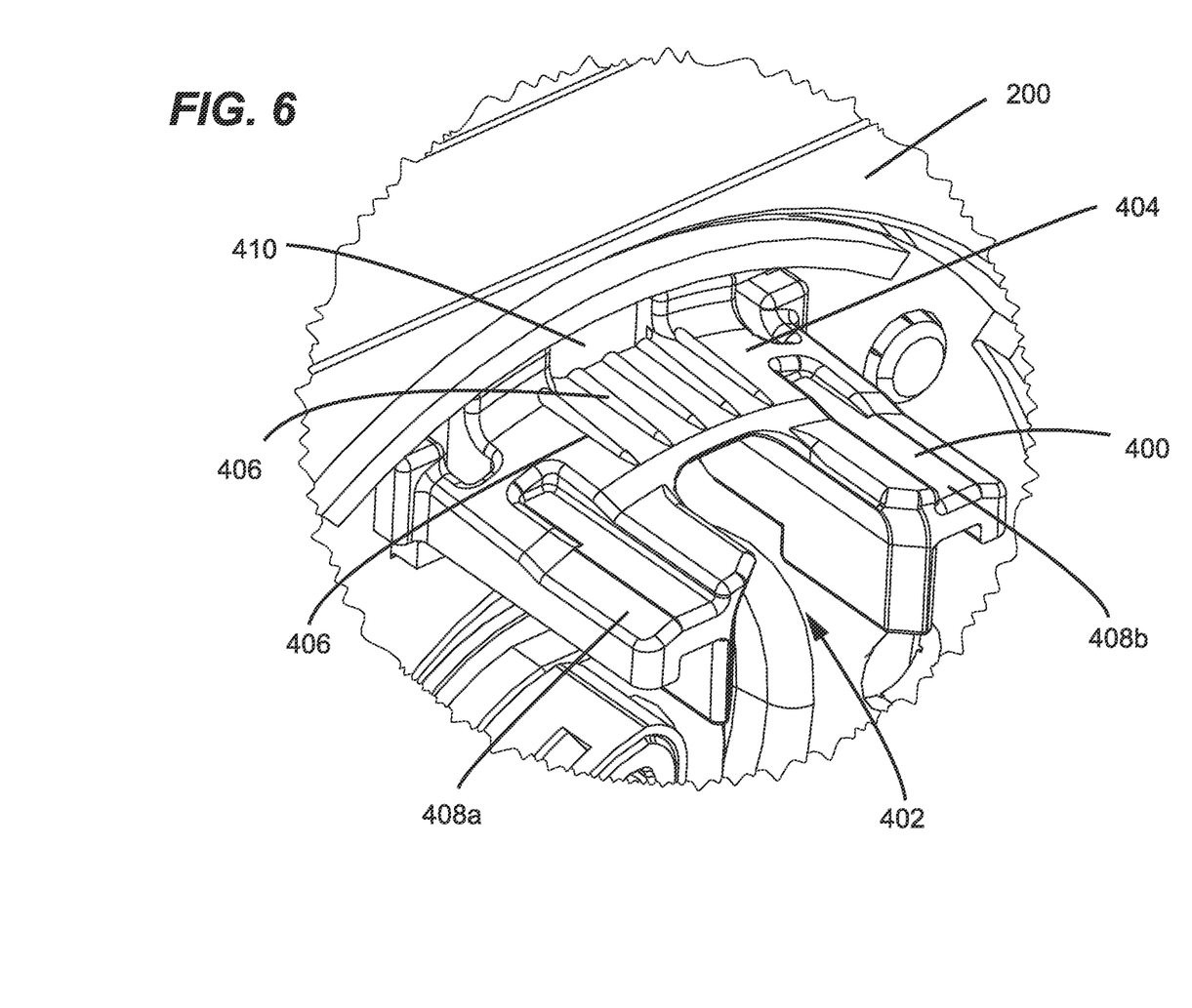
FIG. 6 illustrates a detailed view of an example alignment guide.

FIG. 6 illustrates another detailed view of an example alignment guide 400. The alignment guide 400 is installed on the interior chassis 200 through a variety of means. In an exemplary embodiment, the alignment guide 400 is removable from the interior chassis 200. The alignment guide 400 may be connected to the interior chassis 200 with a snap fit mechanism, a friction fit mechanism, or with a screw. However, in other embodiments, the alignment guide 400 may be permanently attached to the interior chassis 200.

A connection point for connecting the alignment guide 400 to the interior chassis 200 may be located at the extension portions 408a, 408b. In an example embodiment, a connection point (not shown) may be a peg or recess that frictionally engages with an opposing peg or recess in the interior chassis 200. In the embodiment shown, snap fit tabs 401a-b are insertable within an opening in the interior chassis 200 to engage the alignment guide to the interior chassis 200. In an alternative embodiment comprising screws as part of the connection point, the screw(s) may be accessible from either the alignment guide 400 or from the interior spindle portion 206.

The extension portions 408a, 408b extend a predetermined length toward the exterior chassis (not shown) to receive at least a portion of the mounting post (not shown) within the channel 402. The length of the extension portions 408a, 408b is less than the width of the door on which the door handle assembly 100 is installed.

The width of the channel 402 is configured to snugly fit the mounting post 308, and also a mounting screw 414. As shown, the channel 402 may be open on the top and/or bottom, wherein the channel 402 only includes a first and second side formed by the first and second extension portions 408a, 408b. However, in an alternative embodiment, a top portion and/or a bottom portion may further form the channel 402.

Figure 7:
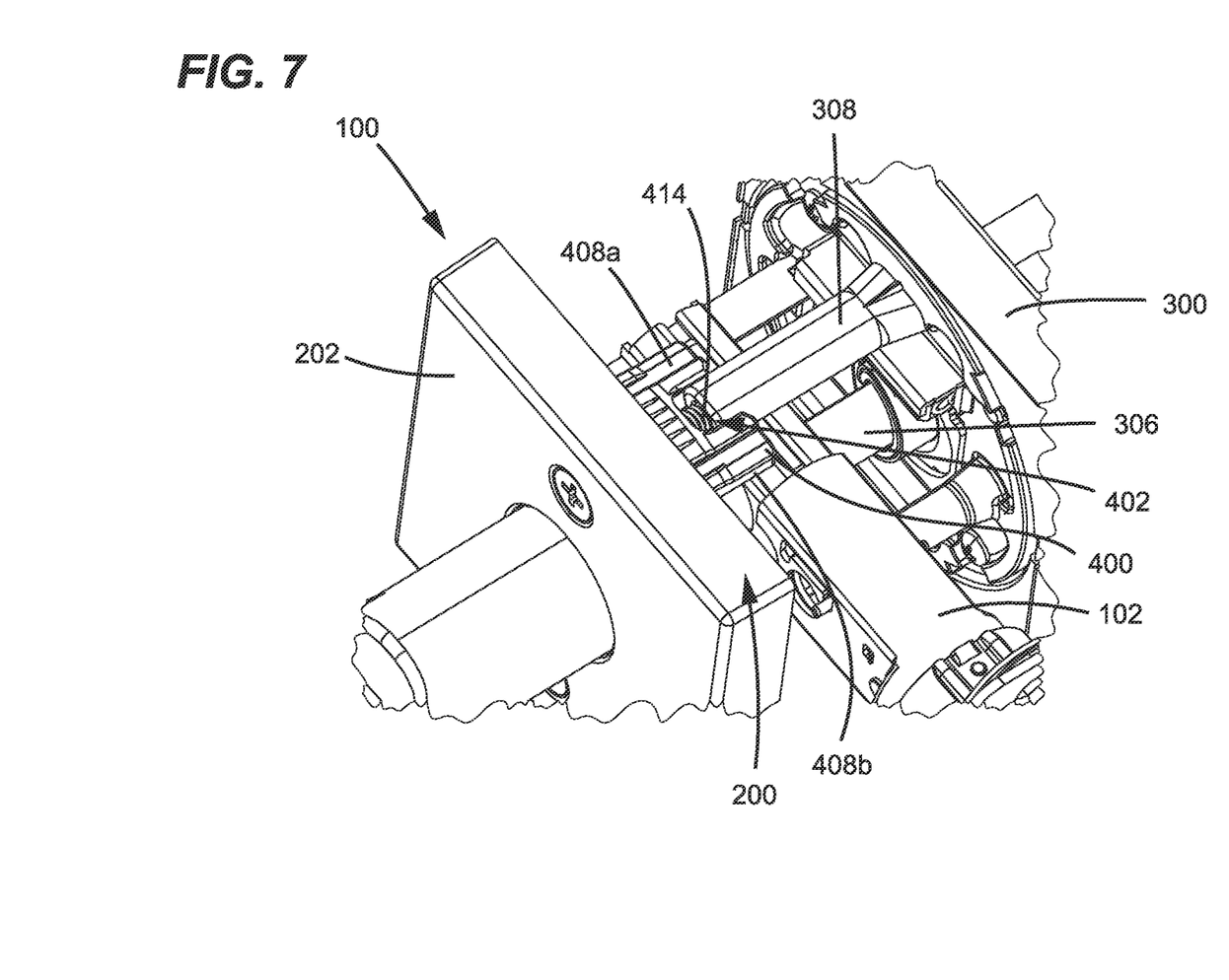
FIG. 7 illustrates an embodiment of a mounting post at least partially engaged with a channel of the alignment guide.

FIG. 7 illustrates an embodiment of the mounting post 308 at least partially engaged within a channel 402 of the alignment guide 400. As shown, the door handle assembly 100 is mounted to a door, but the door is not shown. The interior chassis 200 is connected to the latch assembly 102 and the exterior chassis 300. The latch assembly 102 is connected to the interior spindle portion 206 and the exterior spindle portion 306. The latch bolt (not shown) extends from an end of the latch assembly 102 and external to the door (not shown).

The interior chassis 200 is also connected to the exterior chassis 300 via the alignment guide 400 and the mounting post 308. The interior spindle portion 206 and the exterior spindle portion 306 are located in a center of the door handle assembly 100. As shown, in an installed configuration, the alignment guide 400 and the mounting post 308 are located above the center of the door handle assembly 100. Although not shown, a second alignment guide 400b and a second mounting post 308b would be located below the center of the door handle assembly 100.

The alignment guide 400 includes the mounting screw borehole 412 which has a diameter greater than that of the mounting screw 414; the mounting post 308 has an interior threaded opening 309 that engages with the mounting screw, such that as the mounting screw is inserted through the borehole 412 from an interior side of the door, it will engage with the threaded opening. Tightening the mounting screw 414 will draw the mounting post 308 into the channel 402 until the interior chassis 200 and exterior chassis 300 are flush with interior and exterior surfaces of the door.

The mounting post 308 extends a predetermined length towards the interior chassis 200 to engage the channel 402 of the alignment guide 400. The length of the mounting post 308 is less than the width of the door on which the door handle assembly 100 is installed. For example, the mounting post is typically less than 1⅜ inches in length, and more typically between 1 inch to 1¼ inches. This ensures that the mounting post is not too long to allow for installation on thin (typically 1⅜ inch) doors. At the same time, the extension portions may extend ½ to 1 inch, such that the mounting post 308 is inserted within the channel 402 as interior chassis 200 and exterior chassis 300 are brought together from a distance of greater than 1⅞ inches (e.g., at a distance of 2 inches or more). However, as previously noted, the channel 402 is of adequate depth to allow the interior chassis 200 and exterior chassis 300 to converge to a distance of as little as 1¼ to 1⅜ inches to accommodate varying door thicknesses, typically in the range of 1⅜ inches to 1⅞ inches.

Figure 8:
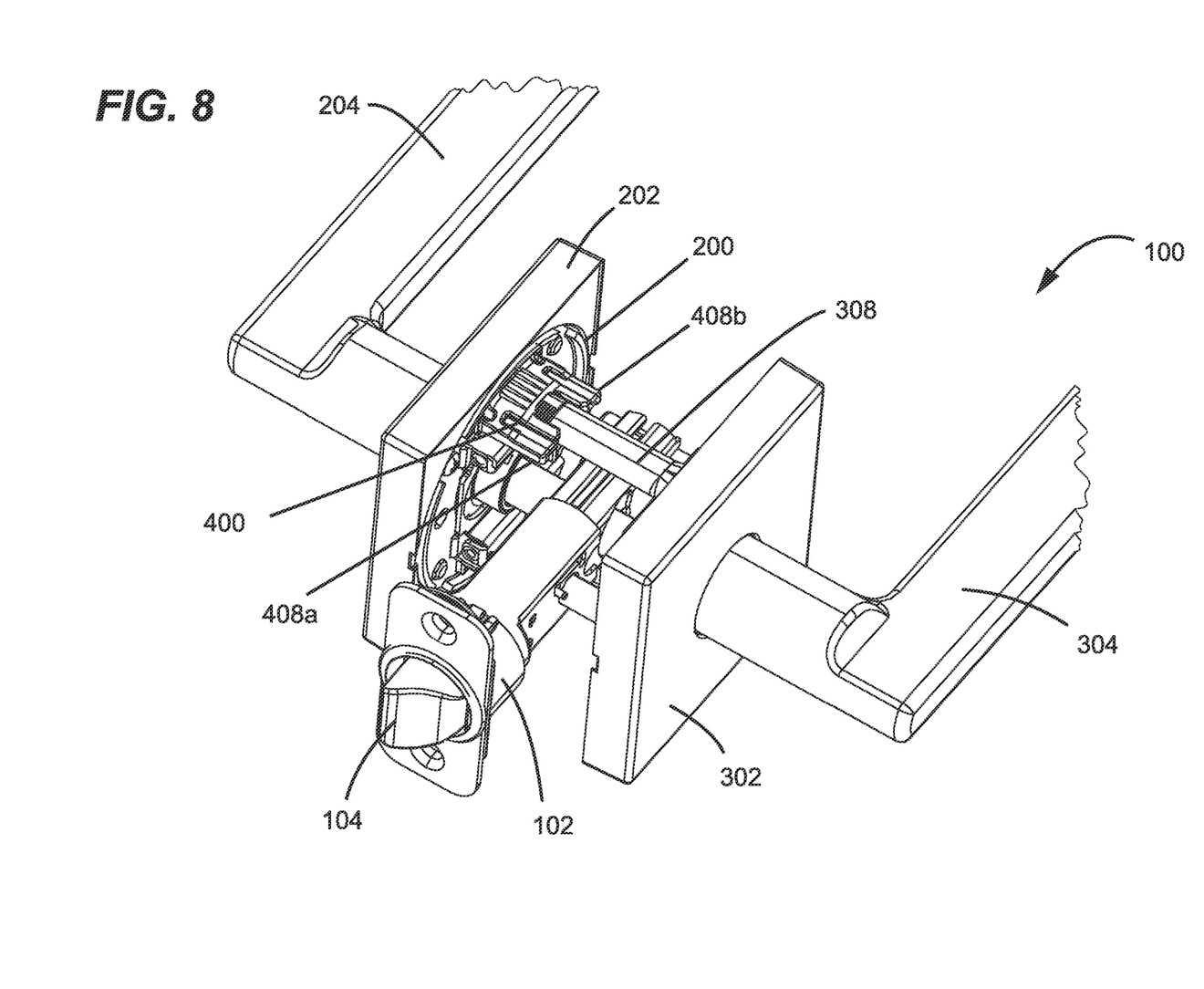
FIG. 8 illustrates another embodiment of the door handle assembly of FIG. 1 in an installed configuration.

FIG. 8 shows the door handle assembly 100 in an installed configuration, with the door removed. Each of the handles 204, 304 extend from a handle mount 210, 310 that is rotatably attached to a trim portion 202, 302, respectively. In the example shown, the interior trim portion 202 and the exterior trim portion 302 each encase the interior spindle portion 206 and the exterior spindle portion 306, respectively. The exterior spindle portion 306 extends through the latch assembly 102 to the interior spindle portion 206. The alignment guide 400 extends from the interior chassis 200 in a direction towards the mounting post 308 of the exterior chassis 300. As shown, the mounting post 308 fits snugly within the channel 402 of the alignment guide 400. The first and second extension portions 408a, 408b guide the mounting post 308 into the channel 402.

The door handle assembly 100 is capable of being installed by a single user. In an example method, the latch assembly 102 is first installed within a cross borehole in a door. Then, the exterior chassis 300 is installed within a borehole of the door. Next, the interior chassis 200 is placed within the borehole of the door. The alignment guide(s) 400 of the interior chassis 200 receive the mounting post(s) 308 of the exterior chassis 300, which automatically aligns the interior chassis 200 with the exterior chassis 300. As a user inserts the mounting screw 414 into the mounting screw borehole 412, the user can align the interior trim portion 202. For example, in the case of a rectangular trim portion, the user can ensure that the trim portion is properly oriented. The user can then screw down the mounting screw 414 through the mounting screw borehole 412 into the mounting post 308 without further needing to concurrently view the exterior trim portion 302 to validate its proper alignment, because the alignment guide(s) 400 ensure that it is in alignment with the interior trim portion 202, thereby increasing mounting convenience. As specifically seen in FIG. 9, a cross-sectional view of the mounting screw 414 located within the channel 402 of the alignment guide 400 and engaged with the mounting post 308, as the alignment guide 400 receives the mounting post 308, ensures alignment of the interior and exterior trim portions 202, 302.

Figure 9:
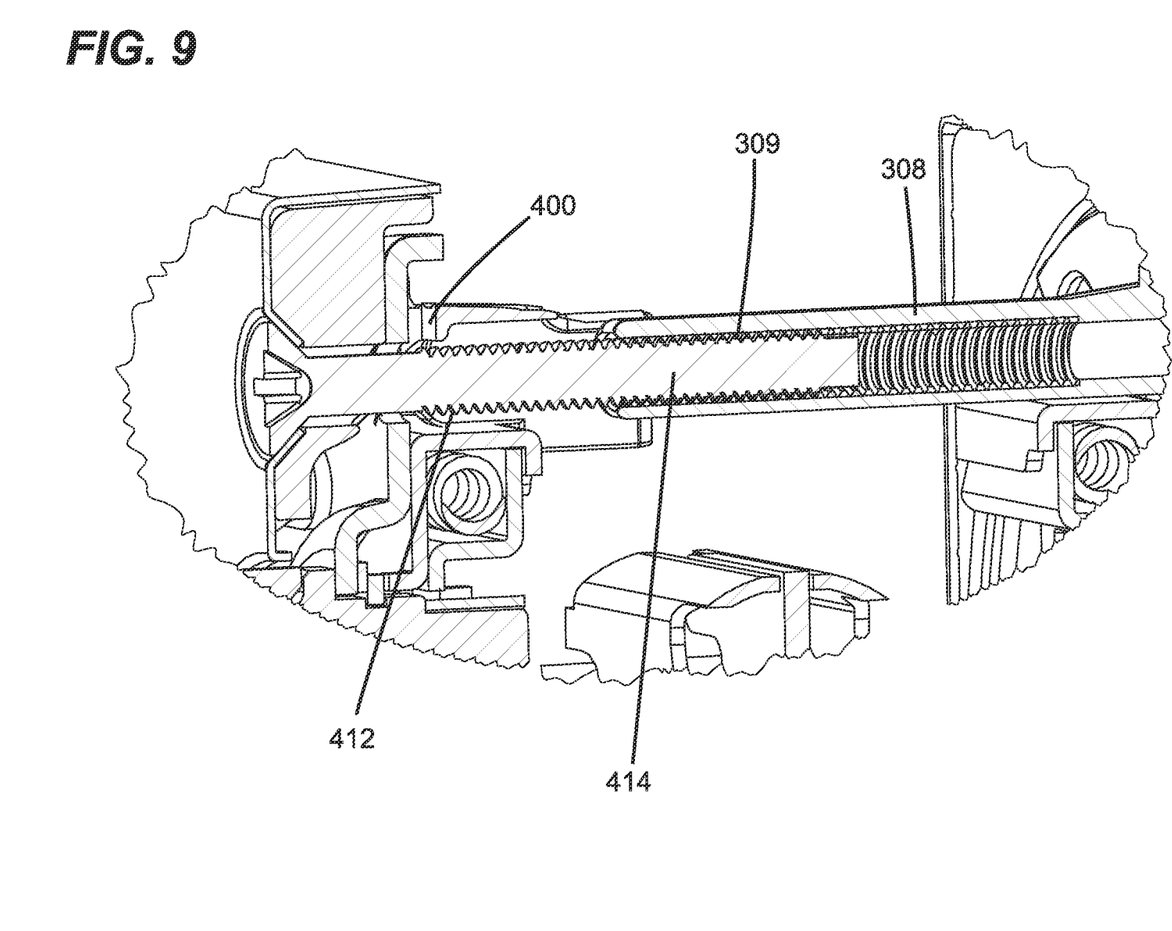
FIG. 9 illustrates a cross-sectional view of a mounting screw located within the channel and the mounting post.

Notably, during mounting of the door handle assembly to a door, a user can correct the rotational orientation of the interior trim portion 202 and the exterior trim portion 302, and the correct orientation is maintained by the bore engagement surface 404 of the alignment guide 400. Once the correct orientation is achieved, the user can screw the mounting screw(s) 414 in the mounting screw borehole 412. If the borehole or latch assembly 102 is misaligned, the user can remove at least one of the alignment guides 400 as needed.

Figure 10:
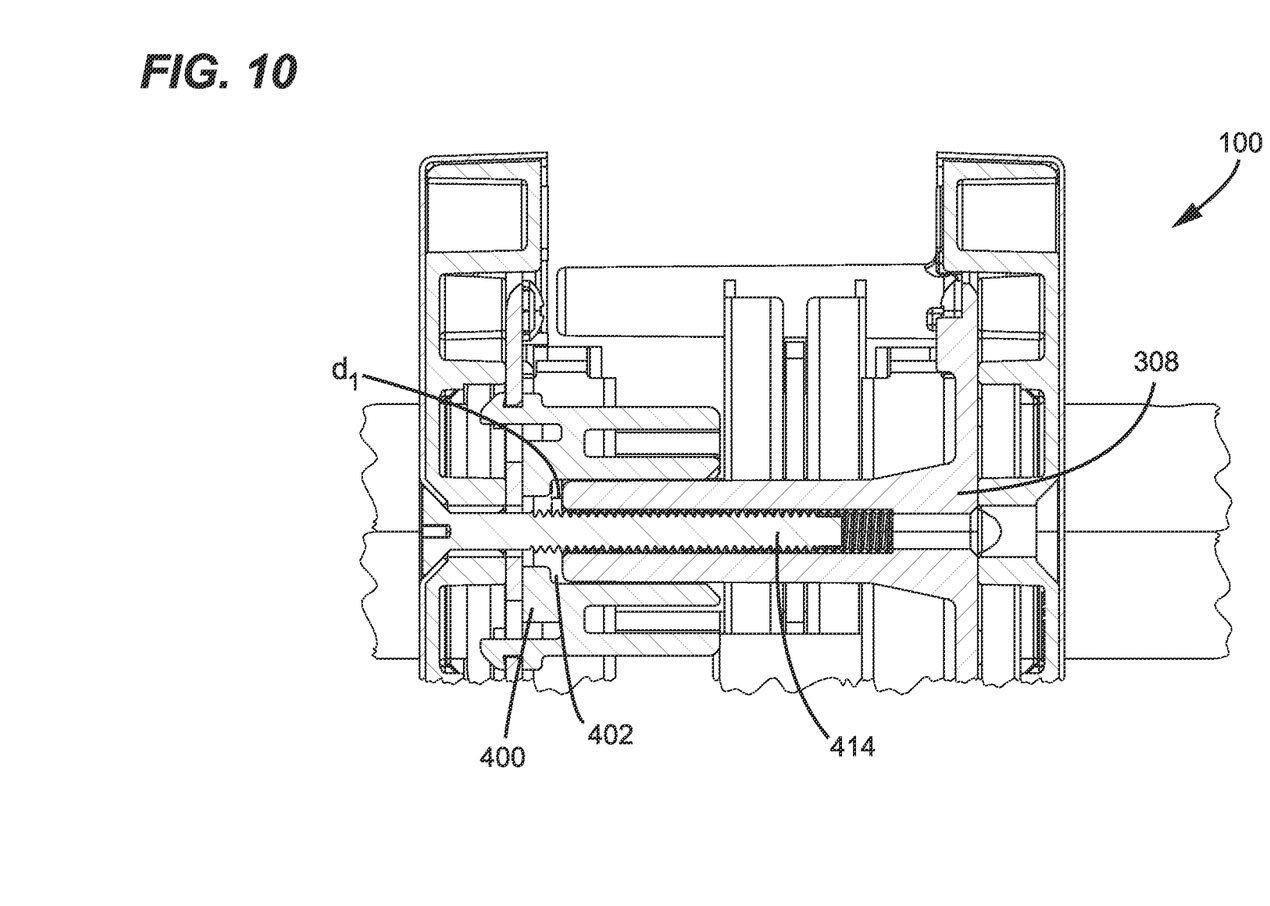
FIGS. 10 and 11 illustrate an embodiment of the door handle assembly of FIG. 1 mounted to doors with differing door widths.
Figure 11:
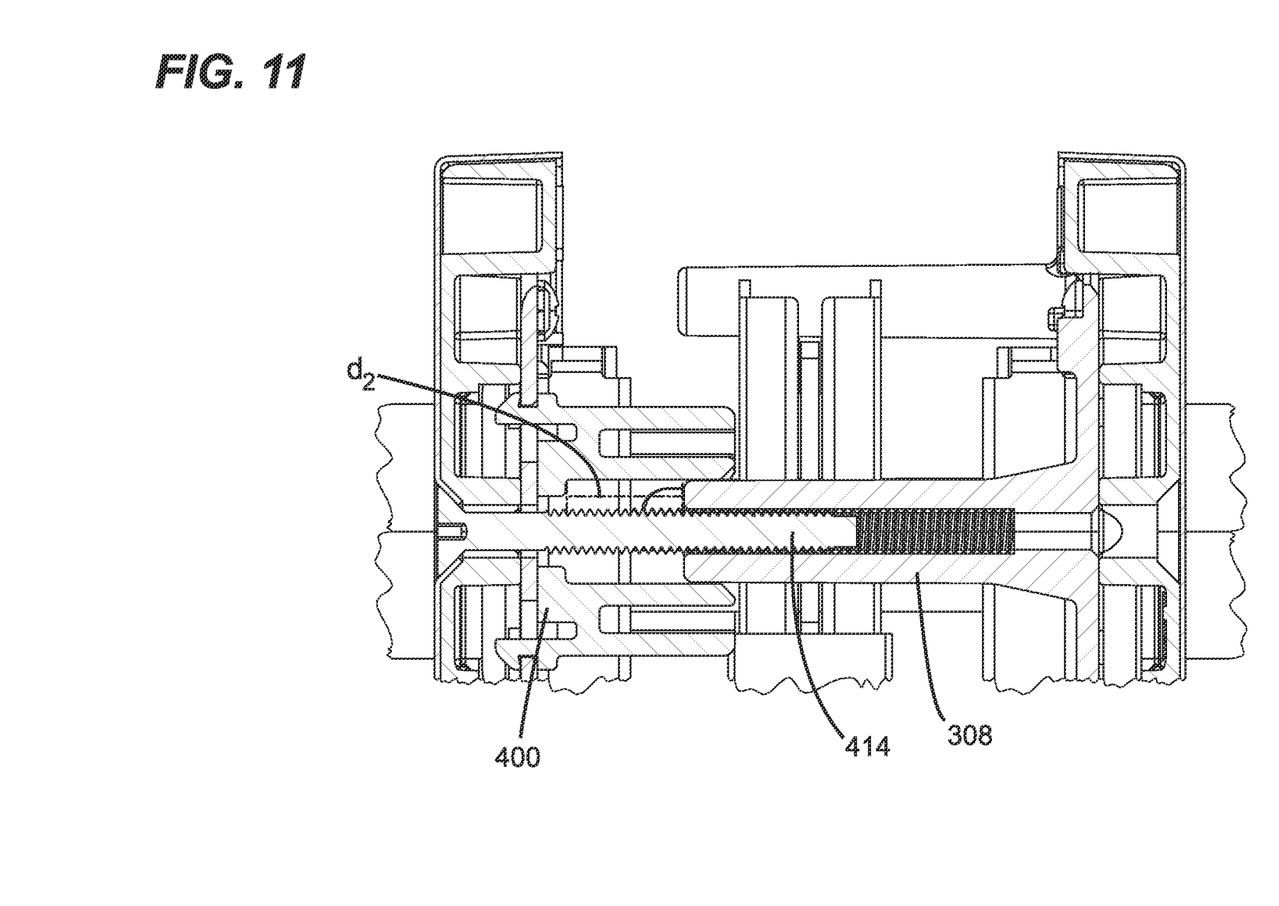

FIGS. 10 and 11 illustrate an embodiment of the door handle assembly 100 mounted to doors with differing door thicknesses. A telescoping feature of the channel 402 allows for automatic accommodation during installation of the door handle assembly 100 to different door thicknesses.

As seen in both FIGS. 10 and 11, the mounting post 308 is inserted within the channel 402 of the alignment guide 400. As shown, the mounting post 308 can be inserted different distances d1, d2 within the channel 402. The mounting post 308 is inserted farther within the channel 402 for a thinner door, as shown in FIG. 10. The mounting post 308 is inserted a shorter distance within the channel 402 for a thicker door, as shown in FIG. 11. However, in either case, when installed on a door, the mounting post 308 resides at least partially within the channel 402.

Referring to FIGS. 1-11 generally, it is noted that the door handle assembly described herein has a number of advantages in terms of ease of assembly and accommodation of various mounting possibilities. In particular, the door handle assembly allows an installing user to automatically align interior and exterior trim pieces concurrently by viewing only an interior trim piece, since the exterior trim piece will automatically align therewith. Further, the telescoping engagement of the alignment guide with the mounting post accommodates various door widths while ensuring alignment of interior and exterior trim pieces. Still further, slight variations in alignment due to a poor door treatment or misaligned latch are accommodated by the semi-flexible nature of the alignment guide(s) as well as the removable nature of those alignment guide(s) if needed. Additional advantages are apparent by way of the description of the door handle assembly provided herein, and as reflected in the claims included below.

The description and illustration of one or more embodiments provided in this application are not intended to limit or restrict the scope of the invention as claimed in any way. The embodiments, examples, and details provided in this application are considered sufficient to convey possession and enable others to make and use the best mode of the claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A door handle assembly comprising:
   an interior chassis including:
      an interior trim portion;
      an interior handle mount rotatably attached to the interior trim portion; and
      an interior spindle portion rotatable with the interior handle mount;
   an exterior chassis including:
      an exterior trim portion;
      an exterior handle mount rotatably attached to the exterior trim portion;
      an exterior spindle portion rotatable with the exterior handle mount and axially aligned with the interior handle mount; and
      a mounting post extending toward the interior chassis from the exterior trim portion offset from the exterior spindle portion; and
   an alignment guide removably attached to the interior trim portion chassis and formed of a resilient material, wherein the alignment guide includes a bore engagement surface and first and second extension portions extending from the bore engagement surface, and wherein a partially open channel is formed between the first and second extension portions and the bore engagement surface, the alignment guide extending toward the exterior chassis from the interior chassis and the partially open channel is aligned to receive the mounting post.

2. The door handle assembly of claim 1, wherein the mounting post is integrally formed with the exterior trim portion.

3. The door handle assembly of claim 1, further comprising an interior handle attached to the interior handle mount and an exterior handle attached to the exterior handle mount.

4. The door handle assembly of claim 1, wherein the resilient material comprises a semi-rigid material.

5. The door handle assembly of claim 1, wherein the alignment guide extends a predetermined length toward the exterior chassis to receive at least a portion of the mounting post within the partially open channel.

6. The door handle assembly of claim 5, wherein the partially open channel has a receiving depth such that a distance between the interior trim portion and the exterior trim portion is adjustable while at least the portion of the mounting post is maintained within the partially open channel.

7. The door handle assembly of claim 1, wherein the exterior chassis further includes a second mounting post extending toward the interior chassis from the exterior trim portion offset from the exterior spindle portion in an opposite direction from the mounting post.

8. The door handle assembly of claim 1, further comprising a second alignment guide removably attached to the interior chassis and formed of a resilient material, the second alignment guide extending toward the exterior chassis from the interior chassis and including a second aperture aligned to receive a second mounting post.

9. The door handle assembly of claim 8, wherein the bore engagement surface is a first bore engagement surface and the second alignment guide includes a second bore engagement surface.

10. The door handle assembly of claim 9, wherein the first bore engagement surface and the second bore engagement surface are curved surfaces, each including a plurality of ribs forming a frictional engagement with an interior bore surface.

11. The door handle assembly of claim 8, wherein the alignment guide and the second alignment guide each include a grip location engageable to facilitate detachment from the interior chassis.

12. The door handle assembly of claim 1, further comprising a latch positioned at least partially within an interior bore surface and engageable by the interior spindle portion and the exterior spindle portion.

13. The door handle assembly of claim 12, wherein a length of the mounting post in a direction extending from the exterior trim portion toward the interior trim portion added to a length of the alignment guide extending from the exterior trim portion toward the interior trim portion is greater than a depth of the interior bore surface through a door.

14. The door handle assembly of claim 12, further comprising a mounting screw insertable through the exterior trim portion and the partially open channel of the alignment guide to engage within a threaded bore of the mounting post.

15. The door handle assembly of claim 1, wherein the alignment guide comprises at least one snap-fit tab to engage with the interior chassis.

16. A door handle assembly comprising:
an interior chassis mounted on an interior of a door including:
an interior trim portion;
an interior handle mount rotatably attached to the interior trim portion; and
an interior spindle portion rotatable with the interior handle mount;
an exterior chassis mounted on an exterior of the door including:
an exterior trim portion;
an exterior handle mount rotatably attached to the exterior trim portion;
an exterior spindle portion rotatable with the exterior handle mount and axially aligned with the interior handle mount; and
a mounting post extending toward the interior chassis from the exterior trim portion offset from the exterior spindle portion;
an alignment guide removably attached to the interior chassis and formed of a resilient material, wherein the alignment guide includes a bore engagement surface and first and second extension portions extending from the bore engagement surface, and wherein a partially open channel is formed between the first and second extension portions and the bore engagement surface, the alignment guide extending toward the exterior chassis from the interior chassis and the partially open channel is aligned to receive the mounting post; and
a latch positioned at least partially within a bore of the door and engageable by the interior spindle portion and the exterior spindle portion.

17. The door handle assembly of claim 16, further comprising a telescoping feature that allows for an adjustment of a distance between the partially open channel and the mounting post.

18. The door handle assembly of claim 16, wherein the resilient material is selected from ABS or EPDM rubber.

19. A method of installing a door handle assembly, the method comprising:
positioning a latch assembly at least partially within a crossbore of a door;
positioning an interior chassis at a borehole on an interior side of the door, the interior chassis comprising an interior trim portion, an interior handle mount rotatably attached to the interior trim portion, an interior spindle portion rotatable with the interior handle mount, and at least one alignment guide, the at least one alignment guide includes a bore engagement surface and first and second extension portions extending from the bore engagement surface, and a partially open channel is formed between the first and second extension portions and the bore engagement surface, the partially open channel is aligned to receive a mounting post, and the at least one alignment guide removably attached to the interior chassis and formed of a resilient material;
positioning an exterior chassis at the borehole on an exterior side of the door, the exterior chassis comprising an exterior trim portion, an exterior handle mount rotatably attached to the exterior trim portion, an exterior spindle portion rotatable with the exterior handle mount and axially aligned with the interior handle mount, and at least one mounting post extending toward the interior chassis from the exterior trim portion offset from the exterior spindle portion;
aligning the at least one mounting post within the partially open channel of the at least one alignment guide; and
inserting and tightening at least one mounting screw into a corresponding mounting post that extends from the interior trim portion through the at least one alignment guide and the at least one mounting post to the exterior trim portion.

20. The method of claim 19, wherein upon determining that the crossbore or latch assembly is misaligned, removing the at least one alignment guide before inserting the at least one mounting screw.

21. The method of claim 19, further comprising, after inserting the interior chassis and the exterior chassis into the borehole, rotating the interior chassis in a circumferential direction of the borehole to a trim alignment position in which the interior trim portion is aligned, whereby rotating the interior chassis to the trim alignment position automatically aligns the exterior trim portion.

22. The method of claim 19, wherein the at least one alignment guide includes a plurality of ridges extending in a direction non-parallel with a circumferential direction to maintain a rotational position of the interior chassis within the borehole.

23. The method of claim 19, wherein the at least one alignment guide includes at least one snap-fit tab that is insertable within an opening in the interior chassis to engage the at least one alignment guide with the interior chassis.

* * * * *